United States Patent [19]

Palm

[11] Patent Number: 4,682,918
[45] Date of Patent: Jul. 28, 1987

[54] KEYLESS IMPACTING CHUCK
[75] Inventor: Bernhard Palm, Brookfield, Wis.
[73] Assignee: Milwaukee Electric Tool Corporation, Brookfield, Wis.
[21] Appl. No.: 707,593
[22] Filed: Mar. 4, 1985

Related U.S. Application Data

[63] Continuation-in-part of Ser. No. 601,078, Apr. 16, 1984, abandoned.

[51] Int. Cl.4 .......................................... B23B 31/10
[52] U.S. Cl. ............................ 408/241 R; 279/1 K; 279/60
[58] Field of Search .................. 279/60, 61, 62, 63, 279/64, 65, 1 B, 1 K, 75; 81/90 A; 408/241 R

[56] References Cited

U.S. PATENT DOCUMENTS

| 2,684,856 | 7/1954 | Stoner | 279/61 |
|---|---|---|---|
| 3,237,955 | 3/1966 | McCarthy et al. | 279/63 |
| 3,506,277 | 4/1970 | Harms | 279/63 X |
| 4,277,074 | 7/1981 | Kilberis | 279/60 |
| 4,317,578 | 3/1982 | Welch | 279/62 X |
| 4,395,170 | 7/1983 | Clarey | 279/62 X |
| 4,460,296 | 7/1984 | Sivertson, Jr. | 279/62 X |
| 4,498,682 | 2/1985 | Glore | 279/1 K |
| 4,526,497 | 7/1985 | Hatfield | 279/1 K X |
| 4,536,113 | 8/1985 | Hatfield | 279/1 K X |

Primary Examiner—Eugene F. Desmond
Assistant Examiner—Glenn L. Webb
Attorney, Agent, or Firm—Bayard H. Michael

[57] ABSTRACT

A keyless chuck for a power drill having a drive spindle projecting from the drill housing. The chuck body is fixed on and rotatable with the spindle and has a plurality of jaws mounted for movement on axes inclined with respect to the spindle axis. The collar is mounted for rotation with and with respect to said body and has a split nut connected to the jaws to move them on said axes to grip or release a tool shank when there is relative rotation between said collar and said body. A ring is splined on the housing and is spring biased toward the housing. The ring is manually movable toward the collar to bring the axially projecting lugs on the ring in engagement with lugs on the collar to retard the collar from rotating which causes relative rotation between the body and the collar when the body is rotated. Inclined faces on the lugs force the lugs apart when movement of the jaws is prevented and the lugs cause an impacting action to overcome static friction. In one embodiment the splined ring includes a dished spring seat which has apertures for support fingers to project through from the gear case. A C-ring is fixed in the fingers to serve as a seat for a spring compressed between the C-ring and the dished seat. In the preferred embodiment a resilient retainer having a U or channel cross section has an angular segment removed so it can be flexed to a small diameter to pass under a shoulder projecting inwardly from the ring. This enables the retainer to be fixed to the gear case by engaging an inner groove and to also retain a bearing in place. The compressed biasing spring acts between the shoulder and the retainer wall nearer the chuck and the spring is prevented from contacting a rotating surface.

8 Claims, 9 Drawing Figures

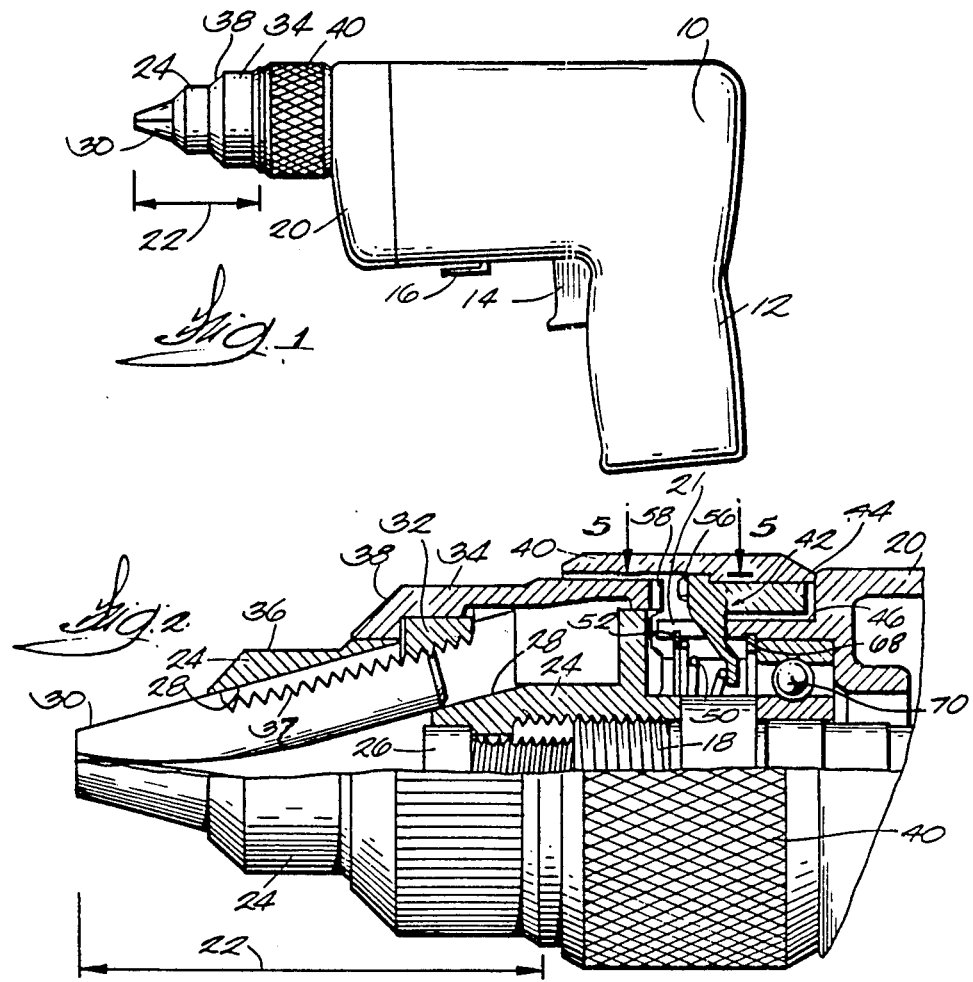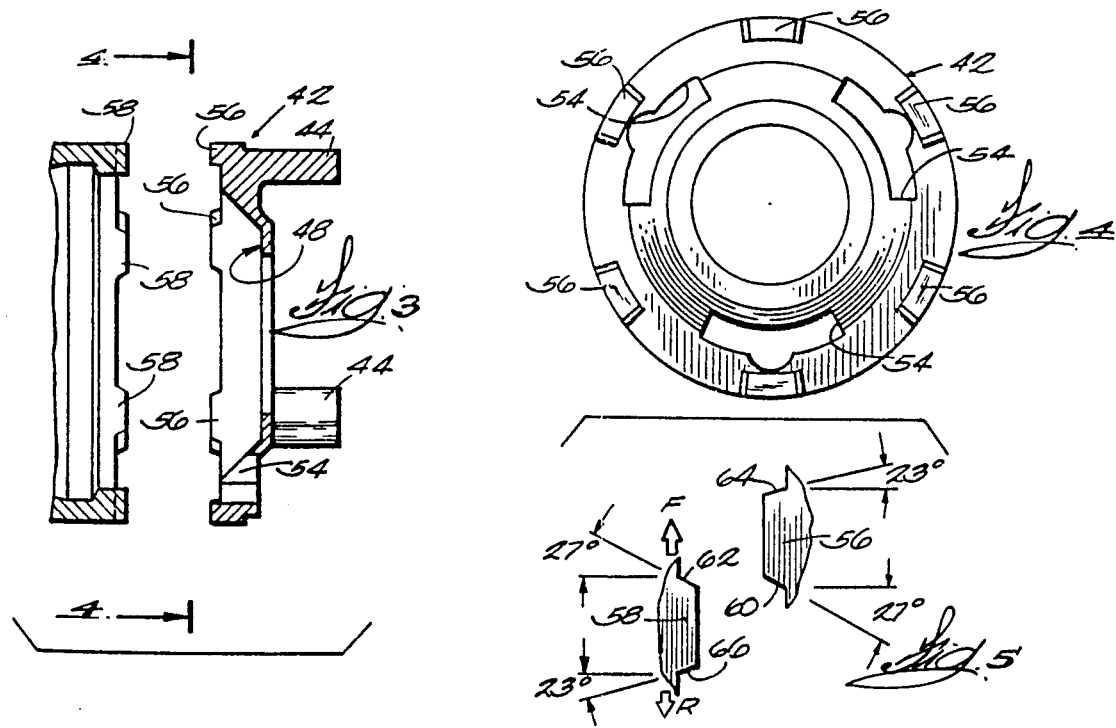

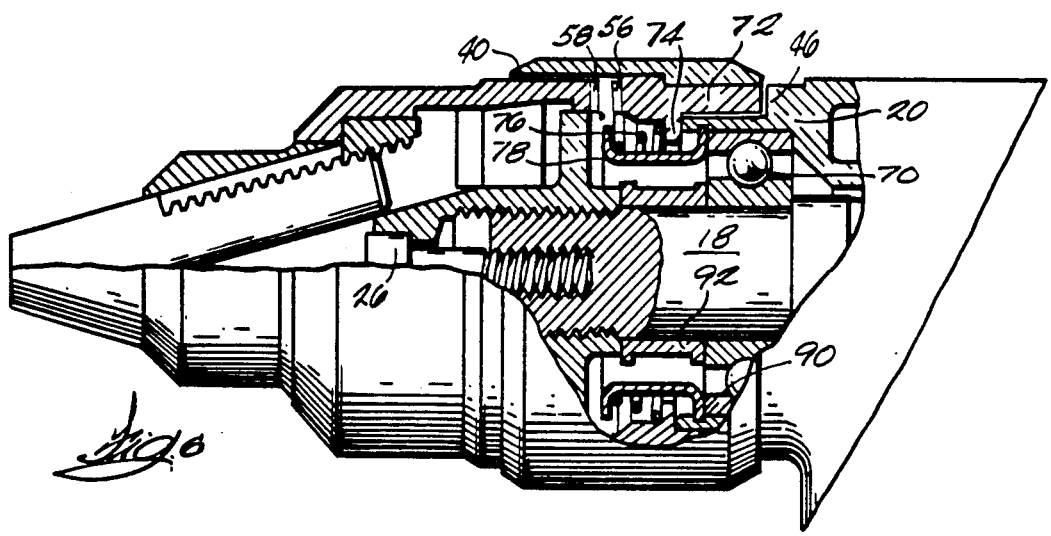
_Fig.6_
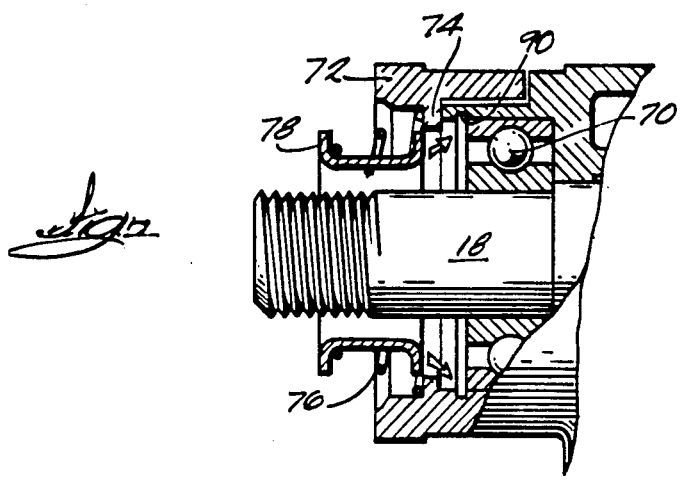
_Fig.7_
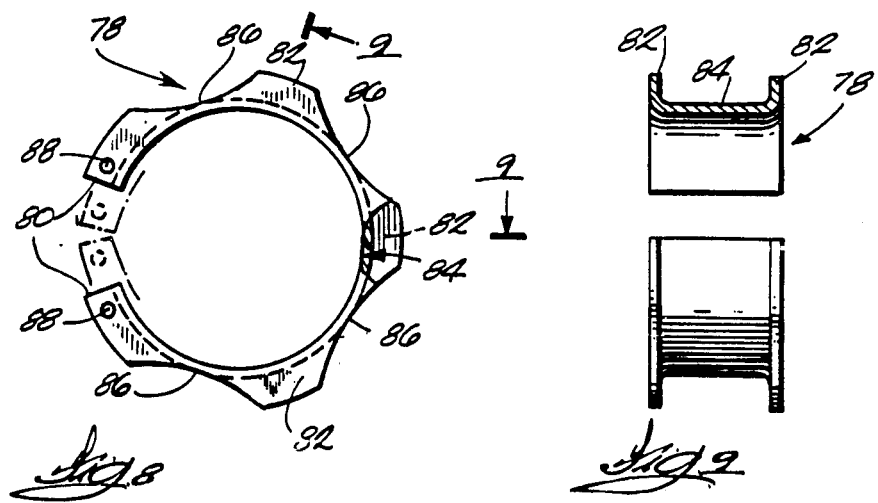
_Fig.8_   _Fig.9_

KEYLESS IMPACTING CHUCK

REFERENCE TO COPENDING APPLICATION

This application is a continuation-in-part of my copending application Ser. No. 601,078, abandoned filed Apr. 16, 1984.

BACKGROUND OF THE INVENTION

This invention relates to a keyless chuck for a power drill or the like. Prior keyless chucks have suffered from various problems which have limited use of the chucks. They have been quite complicated and therefore costly. They may grip the tool so tightly it is extremely difficult to release the tool. Others do not grip tight enough. The prior designs generally have a sleeve which is manually actuated to engage the drive to close or open the chuck jaws. The sleeve usually rotates with the chuck and can harm the operator. To avoid that problem one design uses a floating sleeve which necessitates expensive construction.

This invention is directed to overcoming such problems to provide a high performance, easy-to-operate keyless chuck at reasonable cost . . . a cost very competitive with a standard wrench operated geared chuck. The chuck incorporates an impacting feature allowing a rapid series of impacts to be delivered to open or close the jaws.

SUMMARY OF THE INVENTION

A feature of this invention is to provide an improvement for a drill chuck of the type having a chuck body mounted on and rotatable with the drive spindle of a power drill. The body supports three jaws which move on inclined axes in response to relative rotation between a collar mounted on and rotatable with and with respect to the body. A sleeve is nonrotatably mounted on the gear case of the drill but is axially slideable to engage and hold the collar against rotation with the chuck body whereby the relative movement causes said jaws to grip or release the shank of a tool. The sleeve is biased out of engagement with the collar and, being nonrotatable, can be safely gripped by the operator and actuated to engage the collar while the chuck is rotating to cause impact blows to be delivered to the jaws. The impact blows to the split nut cause a sharp increase in the grip or release force on the jaws.

The sleeve is splined on the gear case of the drill for axial movement on the axis of the drive spindle and has lugs engageable with lugs on the collar. The actuating sleeve is biased towards the gear case of the drill. This bias direction is contrary to the prior art and calls for some novel construction.

A further feature is to provide the lugs with interengaging sloping cam faces, the angle of the engaging faces with respect to the chuck axis being greater when the chuck is driven in the reverse direction than when the chuck is driven in the forward direction so the impact force when the chuck is driven in reverse is greater than the closing impact and the chuck will always open. Both angles develop sufficient axial force in the disengagement direction to ensure disengagement after impact.

The fact that the actuating sleeve does not rotate with the chuck at any time is an important feature in that the operator does not risk being burned by gripping a rotating part and the design allows the operator to push the sleeve to engage the collar for repeated impacting. Finally, when working in a confined space, any member pushing axially on the sleeve holds the sleeve out of engagement while prior designs would engage the chuck operation.

BRIEF DESCRIPTION OF THE DRAWINGS

FIG. 1 is a side elevation of a drill provided with one embodiment of a keyless chuck.

FIG. 2 is an enlarged view of the chuck portion of FIG. 1 with parts in section.

FIG. 3 is an enlarged exploded view of the drive members carried by the rotating chuck collar and the control sleeve splined on the drill body.

FIG. 4 is a view of the splined drive member taken from line 4—4 in FIG. 3.

FIG. 5 is a fragmentary schematic showing of the drive members to illustrate the 4° difference in the cam or face angles to close and open the chuck jaws to insure opening.

FIG. 6 is a view partly in section of another embodiment of the chuck. This is the preferred design.

FIG. 7 is a detail view showing the method by which the split spring seat/bearing retainer is mounted.

FIG. 8 is an elevation of the seat/retainer showing in dotted lines how the spaced ends can be brought together to allow mounting as in FIG. 7.

FIG. 9 is a view on line 9—9 in FIG. 8 with the top portion in section and the lower portion in quasi-elevation.

DETAILED DESCRIPTION OF THE DRAWINGS

The difference between the two embodiments lies in the manner in which the actuating sleeve is biased. The second embodiment (FIGS. 6-9) is preferred because it is less expensive and easier to assemble. Similar parts in the two embodiments have the same reference numbers.

The hand drill 10, shown in FIG. 1, has a conventional pistol grip 12, trigger 14 actuating the switch and a forward/reverse control 16. A gear case 20 is mounted on the front portion of the drill housing and encloses the customary reduction gearing. The drive spindle 18 projects out of the front of the gear case 20.

The chuck 22 has a body 24 threaded onto the spindle 18 and is retained in assembled position by screw 26 threaded in the opposite direction into the end of spindle 18. The body 24 is provided with three inclined bores 28 in each of which there is mounted a jaw 30 which moves up and down the inclined bore 28 as the split nut 32 rotates around the axis of the chuck and spindle 18. The split nut has a force fit in collar 34. The collar normally rotates with the body 24, but can be rotated relative to the body 24 to cause the split nut 32 to rotate relative to the teeth 37 on each jaw and move the jaws up or down the inclined bores 28. To this point, the present construction is the same as the conventional wrench operated geared chuck.

The usual wrench operated geared chuck has three holes in the body 24 (specifically, in the surface 36) to receive the end of a chuck wrench and thus serve as the pivot point for the chuck wrench while the teeth of the chuck wrench engage the gear teeth provided on the inclined surface 38. In the present instance design surface 38 is smooth since no teeth are necessary nor do there have to be holes in surface 36.

In order to open or close the chuck, the collar 34 must be rotated relative to the body 24. All users of drills are familiar with the fact that simple manual gripping of the collar 34 will serve to open or close the chuck provided there is not substantial resistance to the movement of the jaws (either opening or closing). Thus, one cannot manually hold the collar 34 and turn the jaws tight onto the shank of a tool with sufficient force to permit working the tool.

The force necessary to close or open this chuck, particularly under high load conditions, is derived through an impact drive arrangement controlled by axial movement of the sleeve 40 fixed on, and for all practical purposes a part of, the spline ring or guide plate 42. Details of the spline ring 42 appear in FIGS. 3 and 4. It will be noted that the ring has three splines or fingers 44 which are received in recesses or splines 46 in the nose of the gear case. Thus, the ring 42 and sleeve 40 move in unison. It will be noted that the spline ring or guide plate 42 includes an inwardly dished portion 48 which serves as a seat for compressed spring 50. The other end of the spring 50 seats against the snap ring 52 on the inside of the fingers 21 projecting to the left from the gear case 20 through the openings 54 in the guide plate 42. This construction constitutes an effective splined connection or simply a connection limiting the ring 42 (and sleeve 40) to axial movement. The spring 50 urges the ring 42 and sleeve 40 to the right. This keeps the drive members or lugs 56 on the guide plate 42 out of engagement with the drive members or lugs 58 projecting towards the spline ring from the collar 34. The drive members 56, 58 may be considered to be interference members.

Prior to assembling the sleeve 40 and ring 42 in place, the C-ring retainer 68 for the bearing 70 must be put in place. Then the sleeve/ring 40/42 is put in place followed by spring 50 and then the C-ring 52 goes in.

If the sleeve 40 is moved to the left (in FIG. 2) the non-rotating lugs 56 will be brought into engagement with lugs 58 projecting from the rotating collar 34. This will prevent the collar 34 from rotating with the chuck body 24 and will cause relative rotation between the split nut 32 and the jaws 30 when the spindle 18 is turned. This will close or open the jaws depending upon whether the spindle 18 and chuck body 24 are being driven in the forward (F) or reverse (R) direction. Assume the chuck is being driven in the forward direction. Interengaging faces 60, 62 on lugs 56, 58, respectively, are inclined at 27° with respect to the axis of the chuck. This is illustrated in FIG. 5. This is a rather steep angle and will deliver a very sharp impact to the lugs 58 tending to forceably close the jaws. When the jaws grip a tool and cannot move, the face angles will act to cam the sleeve 40 towards the gear case to disengage the lugs. If the operator continues to push the sleeve towards the chuck, the nonrotating lugs 56 will reengage the collar lugs 58 and deliver another impact. This will repeat as long as the operator persists. This construction will deliver sufficient closing force to the jaws to meet all normal requirements.

Opening a chuck is another matter. In this design the forward/reverse switch 16 is actuated to now drive the chuck in the reverse direction. This means that when the axially movable sleeve 40 is actuated to bring the nonrotating lugs 56 into engagement with the collar lugs 58, the inclined faces 64, 66 will be inclined at 23° to the axis of the chuck. This is 4° less than the face angle in the jaw closing direction. This will develop more force in the split nut 32 in the direction opening the jaws than is obtained with the 27° face angle in the closing direction. Therefore, opening is assured and there is no need to provide for normal operation of the chuck with a chuck wrench. The system will deliver sufficient, repeated impacts to open the chuck. It may not open on the first impact, but with the operator holding the sleeve towards the chuck, a rapid series of impacts will be delivered until the chuck opens. An impact can be considered a force spike of much greater magnitude than the friction between the parts. Therefore, impacting is much more effective than the interference type clutch action found in the prior art. It is the best method which will ensure opening parts which are fouled by rust or grit or when line voltage is low.

The first embodiment (described above) requires some difficult assembly and parts which are expensive (such as the ring 42 with its apertures 54 and dished seat 48). The second embodiment shown in FIGS. 6–9 is preferred since it is cheaper to make and easier to assemble. The first embodiment has the bias spring 50 compressed between C-ring 52 and the dished part 48 of the ring 42 while ring 68 retains bearing 70. In FIG. 6 the ring 72 has a simpler shape providing an internal shoulder 74 which functions as a seat for the large diameter end of compressed, conical spring 76. The small diameter end of spring 76 seats against the forward corner of the spool 78. The spool has an angular segment removed (as may be seen in FIG. 8) with the "ends" 80, 80 well spaced when the spool is unstressed. The radially disposed walls 82, 82 give the spool a channel-like cross section. Where the walls are reduced almost to the bottom 84 as done at four locations 86 to make the spool more flexible to enable the ends 80, 80 to be drawn together as shown in dotted lines in FIG. 8. This can be done with special pliers inserted in the holes 88, 88. This permits the effective diameter of the spool to be reduced to enable the rear wall 82 to pass inside shoulder 74 (see FIG. 7) so as to get back to groove 90. Then the spool is released with the rear spool wall 82 engaged in groove 90 to retain bearing 70 in place. Then spacer 92 can be placed over shaft (spindle) 18. The spring 76 is in place as the spool is moved into position (see FIG. 7).

The spool 78 retains bearing 70 and is fixed to the gear case 20 by reason of its engagement with groove 90. Therefore, the spool replaces C-rings 52, 68 in FIG. 2 and simplifies the gear case by eliminating the projections 21 which pass through apertures 54 in the dished seat 48 which is also eliminated. The spring 76 always seats against non-rotating parts as is true of spring 50 in FIG. 2. Put another way, neither embodiment ever has relative rotation between the biasing spring and the spring seat(s). That is important to prevent wear.

Either chuck can be removed by removing screw 26 and then operating the chuck in reverse to open the jaws so that when the jaws are fully open the impacts will remove the chuck from the spindle.

I claim:

1. In combination with a drill chuck of the type having a chuck body mounted on and rotatable with the drive spindle projecting from the gear case of a power drill, a collar mounted on said body for rotation with and with respect to said body, said body supporting three jaws on inclined axes, a threaded connection between said collar and said jaws whereby said jaws move on said inclined axes in response to relative rotation between said collar and said body, the improvement comprising, means for holding said collar against rotation with said chuck body, said means including a sleeve mounted on said gear case for axial movement toward and away from said collar between first and second positions, interference members on said collar and said sleeve operative when engaged to prevent rotation of said collar whereby rotation of said body causes said jaws to grip or release the shank of a tool, and spring means biasing said sleeve to one of said positions.

2. In combination with a drill chuck of the type having a chuck body mounted on and rotatable with the drive spindle projecting from the rear case of a power drill, a collar mounted on said body for rotation wit and with respect to said body, said body supporting three jaws on inclined axes, a threaded connection between said collar and said jaws whereby said jaws move on said inclined axes in response to relative rotation between said collar and said body, the improvement comprising means for holding said collar against rotation with said chuck body, said means including a sleeve non-rotatably mounted on said gear case for axial movement toward and away from said collar, interference members on said collar and said sleeve operative when engaged to prevent rotation of said collar whereby rotation of said body causes said jaws to grip or release the shank of a tool, and spring means biasing said sleeve away from said collar to disengage said interference members, said spring means being non-rotatable with respect to said gear case and said sleeve under all operating conditions to avoid wear.

3. A drill chuck according to claim 2 in which said spring means is a compressed coil spring.

4. A drill chuck according to claim 3 in which said sleeve includes a first non-rotating spring seat, a second non-rotating spring seat connected to said gear case, said spring being compressed between said non-rotating seats.

5. A drill chuck according to claim 4 in which said sleeve and first seat have a plurality of apertures spaced about the center of the sleeve, and a plurality of support members projecting from said gear case parallel to the axis of the chuck and passing through said apertures, said second seat being mounted on said support members.

6. A drill chuck according to claim 4 in which said drive spindle is journaled in a bearing fixed in said gear case, a spool having a channel-like cross section and fixed in said gear case with the spool wall closer to said bearing engaging said gear case to retain said bearing and fix the spool in said gear case, said spool having an angular segment removed to permit flexure of said spool to reduce the effective diameter thereof and to permit retention of the spool in said gear case by the self bias of said spool, said first annular seat projecting into the channel-like space between the walls of said spool, and said spring being compressed between said first seat and the wall of said spool further from said gear case.

7. A drill chuck according to claim 3 in which said interference members are lugs on said collar and said sleeve, the sides of said lugs being angled relative to the axis of said chuck whereby a force component is developed to axially move said sleeve away from said collar when said jaws cease to move and said collar is forced to rotate.

8. A drill chuck according to claim 7 in which the angle of said sides of said lugs is steep enough to cause an impact to be delivered to said collar when said jaws cease to move, said impact being repeated as long as the user pushes said sleeve toward said collar.

* * * * *